June 14, 1938.　　H. J. VAN DOORNE　　2,120,637
COUPLER FOR TRAILING ORDNANCE AND THE LIKE
Filed Sept. 12, 1936　　4 Sheets-Sheet 1

Inventor
Hubertus Josephus Van Doorne
By
Attorneys.

June 14, 1938.   H. J. VAN DOORNE   2,120,637
COUPLER FOR TRAILING ORDNANCE AND THE LIKE
Filed Sept. 12, 1936   4 Sheets-Sheet 2

Inventor
Hubertus Josephus Van Doorne
By Alexander Dowell
Attorneys.

June 14, 1938.   H. J. VAN DOORNE   2,120,637
COUPLER FOR TRAILING ORDNANCE AND THE LIKE
Filed Sept. 12, 1936    4 Sheets-Sheet 3

Inventor
Hubertus Josephus Van Doorne
By
Attorneys.

June 14, 1938.  H. J. VAN DOORNE  2,120,637
COUPLER FOR TRAILING ORDNANCE AND THE LIKE
Filed Sept. 12, 1936  4 Sheets-Sheet 4
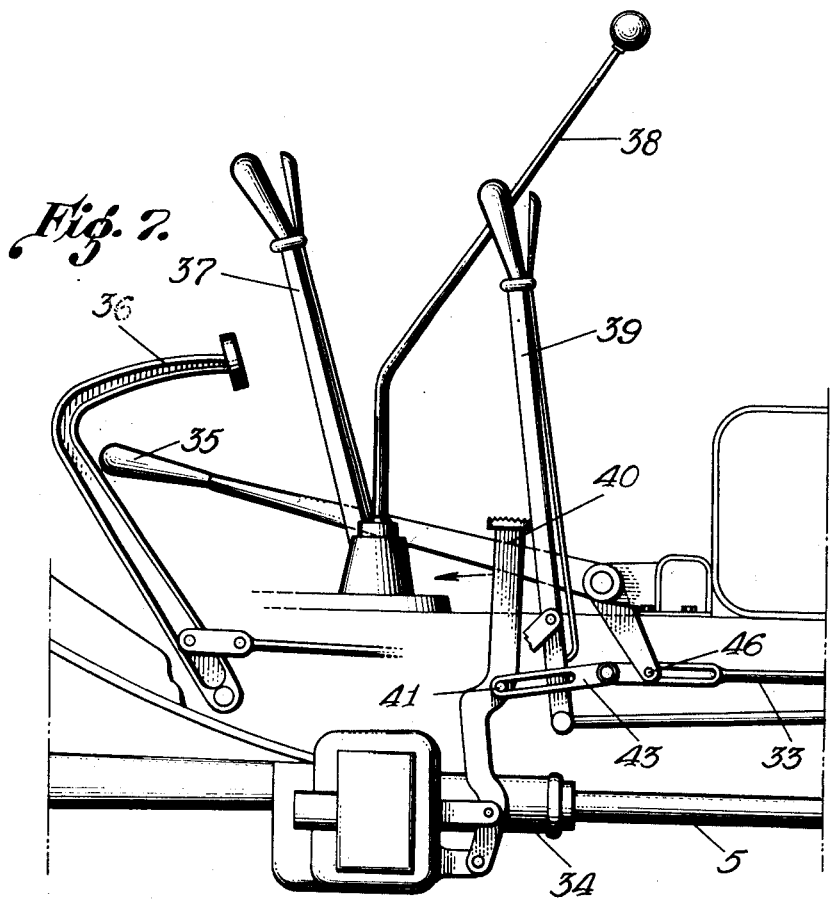
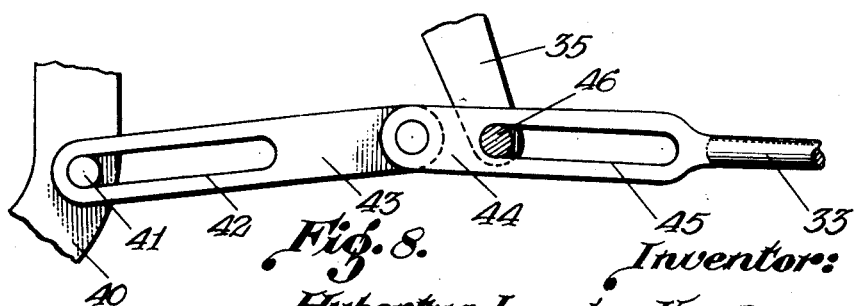
Inventor:
Hubertus Josephus Van Doorne
by Alexander Dowell
Attorneys.

Patented June 14, 1938

2,120,637

UNITED STATES PATENT OFFICE 2,120,637

COUPLER FOR TRAILING ORDNANCE AND THE LIKE

Hubertus Josephus van Doorne, Deurne, Netherlands

Application September 12, 1936, Serial No. 100,554 In the Netherlands September 26, 1935

9 Claims. (Cl. 280—33.15)

When pieces of ordnance or other heavy vehicles are trailed by means of a tractor over uneven ground, conditions may render it impossible or very difficult to move the tractor and the piece of ordnance together. It has been proposed to overcome such difficulties by providing the tractor with a winch; and after the piece of ordnance is unlimbered, the tractor is driven separately over the difficult portions of the ground and located in a suitable position with locked wheels. The winch cable is then engaged with the limber eye, and the piece of ordnance pulled to the tractor by means of the winch, after which the cable is detached and the limber eye is lifted over the limber hook. The unlimbering, the fastening of the winch cable and the hooking on again are operations which cause an appreciable loss of time. With heavy ordnance pieces which have a draw-bar weight of about 1500 lbs., these difficulties are particularly noticeable for in such cases the draw-bar weight is too heavy to permit lifting the same by manual force and thus the use of jacks is necessary in order to lift the drawbar. After having lifted the limber eye at the required height the tractor must be driven forwards and backwards in order to bring the limber hook under the limber eye. It is evident that these operations may cause an unwarranted loss of time when a battery including such ordnance pieces has to change its position, and such operations may be impossible to perform under hostile fire.

The purpose of the present invention is to obviate these drawbacks, and according to my invention the draw-hook which is intended to couple the piece of ordnance or the like to the tractor, is secured to the winch cable so that when a piece of ordnance is trailed over uneven ground and an obstacle is encountered, it is possible to lower the draw-bar of the piece of ordnance till it rests on the ground and thereupon the tractor may be driven away while the cable is unreeled. After the tractor has arrived in a suitable position the drive of the winch is put into operation, so that the piece of ordnance is pulled to the tractor and thereupon the draw-bar is lifted by the cable, and the tractor and the piece of ordnance may be moved together again without necessitating the above described operations of uncoupling and again hooking the limber eye to a fixed limber hook.

According to the invention the draw-hook may be provided with a part which fits in a correspondingly shaped member of the tractor. Thus a rigid support for the draw-hook is obtained so that the same may resist heavy shocks when the tractor is moving over uneven ground.

The rigidity of the connection between the tractor and the piece of ordnance or the like may be still increased by a locking mechanism which, after fully reeling the winch cable, will automatically be put into operation so as to connect the draw-hook to the tractor in such a way that the cable is relieved of the strain of drawing the piece of ordnance or the like. The locking mechanism may comprise a pawl which may be moved by a spring, and a catch adapted to prevent the pawl from moving by the action of said spring until the draw-hook arrives in its normal position, whereupon the catch is shifted so that the pawl is moved quickly by the spring and engages a recess or the like in the draw-hook.

When using a tractor with a mechanically driven winch the driving mechanism of the winch may be automatically released by the draw-hook arriving in its place thus preventing the cable after reeling from becoming overstressed, and thus slip couplings or ratchet couplings, which would otherwise be necessary to prevent this overstressing, are superfluous. This automatic releasing may be effected by placing a displaceable member in the path of the draw-hook or of a part connected therewith which member by means of rods, cables or the like or by a servo-mechanism is connected with the normal releasing mechanism of the winch drive.

The drawings show by way of example an embodiment of a tractor according to the invention.

Fig. 7 is an elevation conventionally showing the arrangement of levers at the front end of the tractor.

Fig. 8 is a detail.

Figure 1:
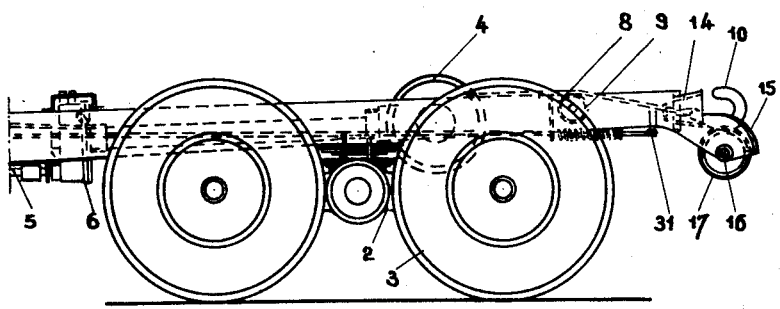
Fig. 1 is a side elevation of the rear portion of a tractor according to the invention.

The rear part of the tractor shown in the drawings is supported by a rear axle 1 on each of which is mounted a swiveling member 2 with road wheels 3, although if desired an endless band may be arranged around the road wheels 3 in order to make the tractor still better adapted to be driven over uneven ground. The tractor is provided with a winch 4 which is driven by the engine through the gearbox, a power-take-off, a shaft 5, a reduction drive 6 and a shaft which is enclosed within the tube 7.

The winch cable 8 is guided by a pulley 9 and has a draw-hook 10 at its outer end. The draw-hook is composed of two parts, i. e., the hook proper which is pivotally connected with a conical part 12 by means of a bolt 11. The winch cable 8 is fixed to the draw-hook by having its end 13 arranged in a bore of increasing diameter in the conical part 12, said end 13 being enlarged by splicing and pouring in metal.

The conical part 12 of the draw-hook fits in a correspondingly shaped member 14 on the tractor which forms a unit with the guiding faces 15 between which a pulley 17 is rotatably journaled on a pin 16. This pulley guides the cable when the same is unreeled and when the ordnance is pulled to the tractor and the draw-bar is being lifted from the ground; also it further serves as a support for the pivotal part of the draw-hook.

The purpose of connecting both hook parts by a pivot is to prevent the draw-hook, when the draw-bar is being lifted, from acting as a lever and from taking such a position with relation to the cable that at the point where the cable leaves the conical part 12 the cable would be bent too sharply. Such would be the case if the hook and the conical part 12 constituted a single unit. The bolt 11 is kept in its place within the part 12 by extensible resilient split rings which are arranged in annular grooves in the part 12.

Figure 2:
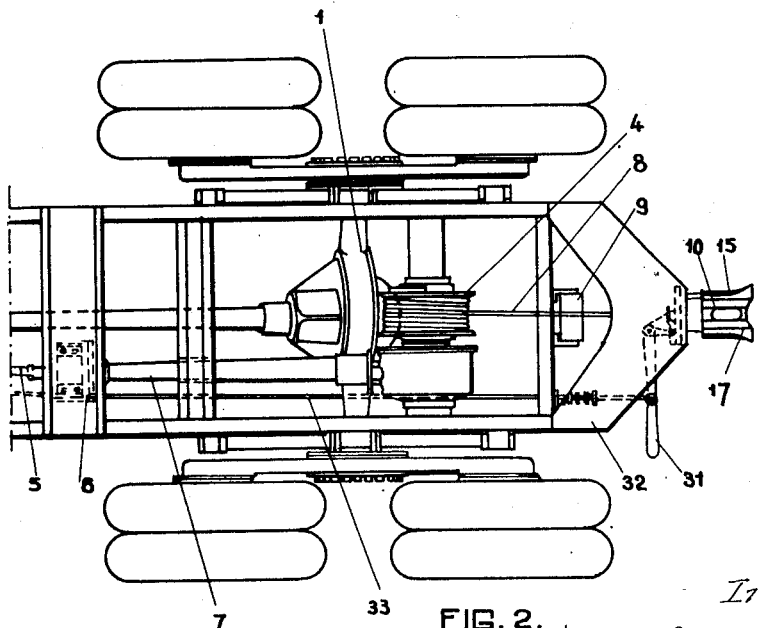
Fig. 2 is a corresponding top view.
Figure 3:
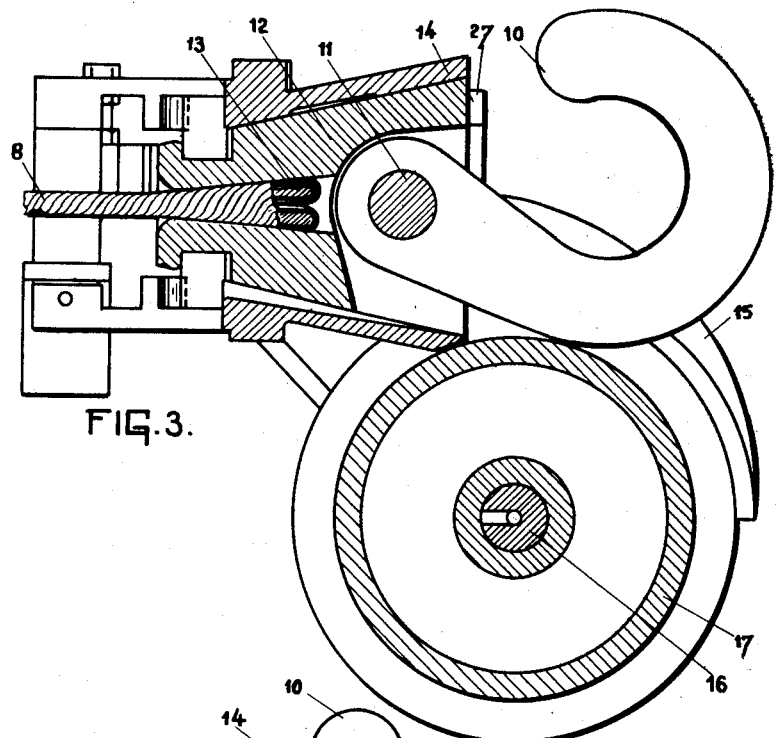
Fig. 3 is a section through the hook and adjacent parts of the tractor on an enlarged scale.
Figure 4:
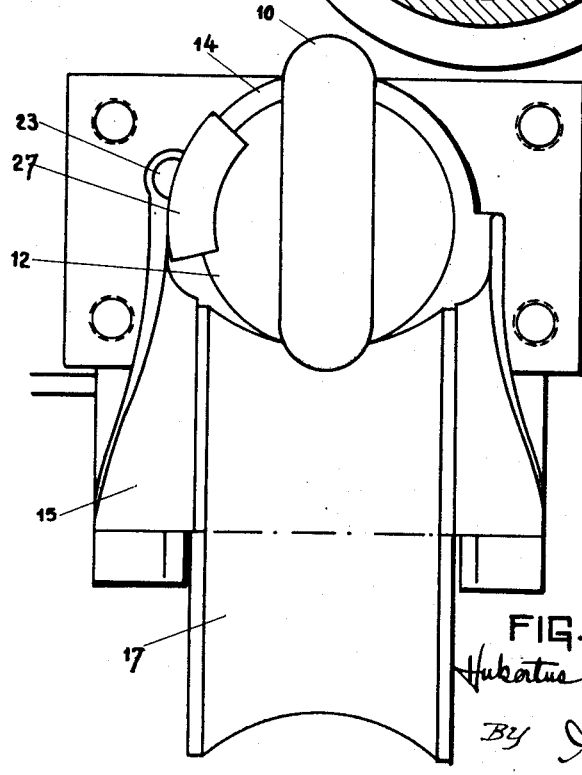
Fig. 4 is a rear view of the parts shown in Fig. 3.
Figure 5:
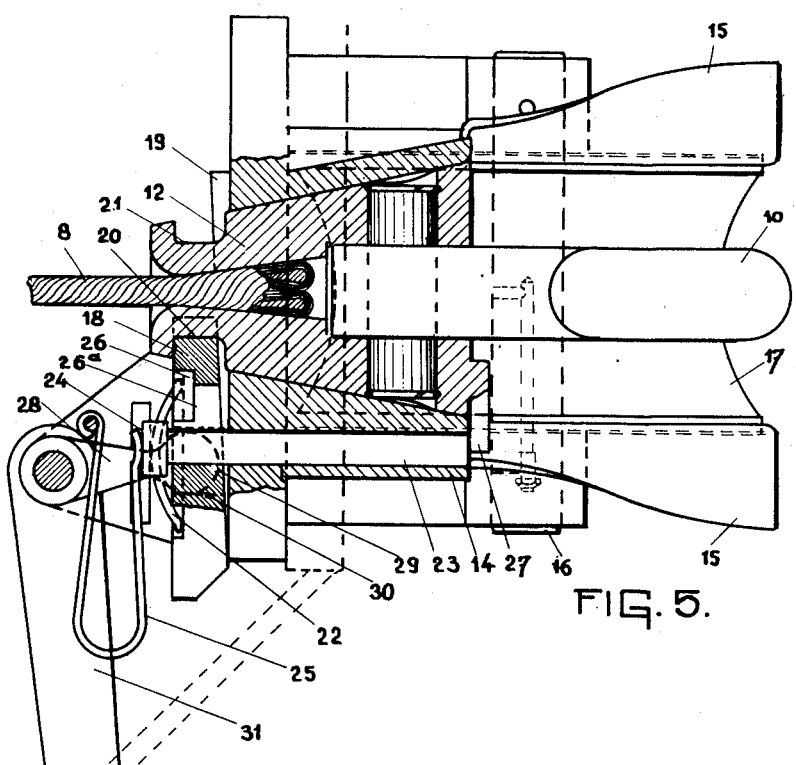
Fig. 5 is a top view of the parts shown in Fig. 3, partly in section.
Figure 6:
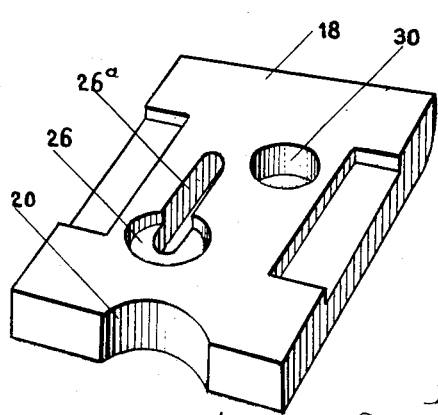
Fig. 6 is a perspective view of the pawl.

When after reeling the winch cable 8 the draw-hook has arrived in its place in the part 14 of the tractor, the draw-hook is locked in this position by means of a pawl 18 which is slidable along guides 19 and engages with its edge 20 a groove 21 of the conical part 12. Springs 22 keep the pawl 18 against guides 19. The guides are inclined so that after wear of the part 12 with relation to the part 14 the pawl 18 is shifted further under the influence of the spring 32 (Fig. 2) and the handle 31, so that the wear is compensated for. The pawl 18 is made in such a way that when the mechanism is new the edge 20 does not engage the groove 21 of the cone 12 to its full depth. If now the co-operating parts 12 and 14 begin to wear the spring 32 will, by means of the lever 31, shift the pawl 18 farther into the groove 21 and as a result of the taper of the guides 19 any play caused by the wear is taken up. When the pawl 18 engages the groove 21 it is automatically locked by a mechanism which operates in the following way:

When the cable is unreeled the pawl 18 is kept in its disengaged position by a catch which consists of a pin 23 slidable in the part 14, the head 24 of which is maintained by a spring 25 in a circular recess 26 in the pawl 18. If the cable is reeled and the draw-hook arrives in its place in the part 14, a projection 27 of the conical part 12 shifts the pin 23 against the action of the spring 25 till the head 24 leaves the circular recess 26, and the pawl 18 may slide with its slot 26a receiving the shank of pin 23 so that the part 20 enters into the groove 21, the pawl 18 being shifted by means of an arm 28 which has a ball-shaped head 29 engaging an opening 30 in the pawl which arm is integral with a lever 31 which is urged rearwardly of the tractor by a spring 32. This lever 31 is connected by a cable or rod 33 with a handle 35 (Fig. 7) near the driver's seat. If it is desired to unreel the winch cable the pawl 18 must be kept in its outermost position by one of these levers until the projection 27 of the draw-hook is so far from the part 14 that under the action of the spring 25 the head 24 of the catch 23 is shifted into the recess 26 and the pawl 18 is locked.

Cable 33 connects the above described mechanism with the normal releasing device of the winch drive. By this means the arrival of the draw-hook in its normal position automatically effects the uncoupling of the winch drive, so that the winch cable 8 cannot be overstressed, or damage parts of the mechanism.

Fig. 7 shows how, by means of rod 33, the mechanism just described is operatively connected with the winch drive. Normal control members are shown, such as a brake pedal 36 and brake hand lever 37, and the transmission control lever 38. Within reach of the driver there are further arranged a lever 39 for operating the winch brake acting on the reduction gearing 6 (Figs. 1 and 2), and a pedal 40 which may be pushed forwardly in order to engage the normal power-take-off 34. The pedal 40 is provided with a stud 41 (Figs. 7 and 8) engaging a slot 42 of a link 43. This link is pivotally connected to an enlarged end 44 of rod 33, said end 44 being provided with a slot 45 in which slides a stud 46 of the above mentioned hand lever 35.

If it is desired to release the draw-hook 10 and to unreel the winch cable, the driver pulls the lever 35 back so that the rod 33 is pulled forwardly of the tractor and the pawl 18 is retracted from the groove 21 of the draw-hook. By means of the winch brake lever 39 the winch is slowly revolved in order to lower the draw-bar of the ordnance piece after which the winch brake 39 is fully released. The lever 35 is then pushed forward again so that the stud 46 slides backward in the slot 45. The rod 33 is held in its foremost position against the action of the spring 32, as the pawl 18 is locked by the catch 23, 24, thus preventing any movement of the lever 31.

During the forward displacement of the rod 33 the slotted link 43 has moved along the stud 41 without moving the pedal 40. If it is now desired to engage the winch drive, the pedal 40 is pushed forward, during which movement the stud 41 slides in the slot 42. Thus the winch is driven from the power-take-off. When now the draw-hook 10 arrives in its normal position in the part 14 of the tractor, the catch 23, 24 is then forced to release the pawl 18, and spring 32 expands and the rod 33 pulls the pedal 40 rearward so that the winch drive is automatically put out of action. In this way the winch cable 8 cannot be wound too tight and thus any overstress of the cable or other parts of the mechanism is prevented.

It is evident that by means of the locking mechanism a limber hook construction is obtained which is as strong as the normal fixed limber hook and possesses the advantage that the driver may release the hook from its seat and may bring the hook again in its place after which the hook will be automatically locked and the winch drive is released; also a further advantage is obtained by the hook being pivoted so that the distance between the end of the hook and the part 14 is smaller than the thickness of the limber eye thus obviating the necessity of using any device for preventing the limber eye from leaving the hook.

The draw-hook need not be directly fixed to the winch cable but the connection may also be indirect, i. e., by securing the draw-hook to a pulley which guides the cable coming from the winch while the end of the cable is secured to the tractor.

The tractor according to the invention is not only adapted for trailing a piece of ordnance but also for other heavy vehicles, such as excavators or the like.

I claim:—

1. In combination, a motor frame; a winch on the frame having a cable; a draw-hook having a shank connected with the cable; a fixed member on the frame adapted to seat the shank; and means for automatically locking the shank in the fixed member and for rendering the winch drive inoperative when the cable is fully reeled.

2. In a combination as set forth in claim 1, said means comprising a movable member on the fixed member adapted to engage the shank; yieldable means normally urging the movable member into engaged position; a catch prevented movement of the movable member when the latter is in disengaged position; a link operated by the movable member and having a slotted connection with the winch drive; and means for releasing the catch when the shank is seated in the fixed member thereby permitting the yieldable means to abruptly shift the movable member.

3. In combination, a tractor having a motor; a winch on the tractor having a cable; means for operating the winch by the motor; a draw-hook having a shank connected with the cable; a fixed member on the tractor adapted to seat the shank; and means for automatically locking the shank in the fixed member and for disconnecting the winch operating means when the cable is fully reeled.

4. In a combination as set forth in claim 3, said said means comprising a movable member on the fixed member adapted to engage the shank; yieldable means normally urging the movable member into engaged position; a catch preventing movement of the movable member when the latter is in disengaged position; a link operated by the movable member and having a slotted connection with the winch drive; and means for releasing the catch when the shank is seated in the fixed member thereby permitting the yieldable means to abruptly shift the movable member.

5. In combination, a tractor having a motor; a winch on the tractor having a cable; means for operating the winch by the motor; a draw-hook having a shank connected with the cable; a fixed member on the tractor adapted to seat the shank; means for automatically locking the shank in the fixed member when the shank is seated; and means operated by the locking means for automatically disconnecting the winch operating means when the shank is seated.

6. In a combination as set forth in claim 5, said locking means comprising a movable member on the fixed member adapted to engage the shank; yieldable means normally urging the movable member into engaged position; a catch preventing movement of the movable member when the latter is in disengaged position; and means for releasing the catch when the shank is seated, thereby permitting the yieldable means to shift the movable member.

7. In a combination as set forth in claim 5, said locking means comprising a movable member on the fixed member adapted to engage the shank; a lever for operating the movable member; yieldable means for normally urging the lever to shift the movable member into engaging position; a catch mounted on the fixed member preventing movement of the movable member when the latter is in disengaged position; and means for releasing the catch when the shank is seated, thereby permitting the yieldable means to shift the movable member.

8. In a combination as set forth in claim 5, said said locking means comprising a movable member on the fixed member adapted to engage the shank; yieldable means normally urging the movable member into engaged position; a catch preventing movement of the movable member when the latter is in disengaged position; and said disconnecting means comprising a link operated by the movable member and having a slotted connection with the winch operating means; and means for releasing the catch when the shank is seated.

9. In a combination as set forth in claim 5, said locking means comprising a movable member on the fixed member adapted to engage the shank; a lever for operating the movable member; yieldable means for normally urging the lever to shift the movable member into engaged position; a catch mounted on the fixed member and preventing movement of the movable member when the latter is in disengaged position; and said disconnecting means comprising a link connected with the lever and having a slotted connection with the winch operating means; and means for releasing the catch when the shank is seated.

HUBERTUS J. van DOORNE.